United States Patent
Jani et al.

(10) Patent No.: US 11,326,109 B2
(45) Date of Patent: May 10, 2022

(54) METAL REMOVAL FROM GLYCOL FLUIDS

(71) Applicant: Baker Hughes, a GE company, LLC, Houston, TX (US)

(72) Inventors: Jagrut Jani, Sugar Land, TX (US); Tran M. Nguyen, Houston, TX (US); Jerry J. Weers, Richmond, TX (US); Zhengwei Liu, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/244,522

(22) Filed: Apr. 29, 2021

(65) Prior Publication Data

US 2021/0246376 A1 Aug. 12, 2021

Related U.S. Application Data

(63) Continuation of application No. 16/573,401, filed on Sep. 17, 2019, now Pat. No. 11,130,918.

(51) Int. Cl.
| | |
|---|---|
| *C10G 29/28* | (2006.01) |
| *B01D 17/04* | (2006.01) |
| *C10G 53/04* | (2006.01) |
| *C10G 71/00* | (2006.01) |

(52) U.S. Cl.
CPC .......... *C10G 29/28* (2013.01); *B01D 17/047* (2013.01); *C10G 53/04* (2013.01); *C10G 71/00* (2013.01); *C10G 2300/205* (2013.01); *C10G 2300/304* (2013.01); *C10G 2300/80* (2013.01)

(58) Field of Classification Search
CPC ........ C10G 29/28; C10G 53/04; C10G 71/00; C10G 2300/205; C10G 2300/304; C10G 2300/80; B01D 17/047
See application file for complete search history.

(56) References Cited

U.S. PATENT DOCUMENTS

| | | | |
|---|---|---|---|
| 3,755,161 A | * | 8/1973 | Yokota ................ B01J 20/3251 210/679 |
| 6,117,333 A | | 9/2000 | Frankiewicz et al. |
| 8,524,074 B2 | | 9/2013 | Braden et al. |
| 8,992,769 B2 | | 3/2015 | O'Rear et al. |
| 9,234,141 B2 | | 1/2016 | O'Rear et al. |
| 9,267,082 B2 | | 2/2016 | Braden et al. |
| 9,447,675 B2 | | 9/2016 | Yean et al. |
| 9,523,043 B2 | | 12/2016 | O'Rear et al. |
| 9,598,648 B2 | | 3/2017 | O'Rear et al. |
| 9,611,434 B2 | | 4/2017 | Morgan et al. |
| 10,179,879 B2 | | 1/2019 | O'Rear et al. |
| 10,179,880 B2 | | 1/2019 | O'Rear et al. |
| 2011/0076246 A1 | | 3/2011 | Haley et al. |
| 2011/0172473 A1 | | 7/2011 | Nguyen et al. |
| 2015/0068749 A1 | | 3/2015 | Wernimont et al. |
| 2015/0068950 A1 | | 3/2015 | See et al. |

OTHER PUBLICATIONS

Ma, Lun, et al., "A new Cu-cystemine complex: structure and optical properties", Journal of Materials Chemistry C., Mar. 31, 2014, vol. 2, No. 21, 4239-4246.
ALCO Chemical "AQUAMET T Trithiocarbonate Metal Precipitant for Metal Removal in Wastewater Treatment and Metal Recovery", Dec. 14, 1999, 8 pages.

* cited by examiner

*Primary Examiner* — Thuan D Dang
(74) *Attorney, Agent, or Firm* — Mossman, Kumar and Tyler, PC

(57) ABSTRACT

Metals, such as mercury, may be removed from glycol fluids by applying a sulfur compound having the general formula HS—X, wherein X is a heteroatom-substituted alkyl, cycloalkyl, aryl, and/or alkylaryl group either alone or in combination with or as a blend with at least one antifoam additive, at least one demulsifier and/or a buffering agent, to chelate the at least one metal and form a chelate complex of the sulfur compound with the at least one metal and then separating the chelate complex from the fluid.

8 Claims, No Drawings

100% # METAL REMOVAL FROM GLYCOL FLUIDS

CROSS-REFERENCE TO RELATED APPLICATION

This application is a continuation-in-part from U.S. patent application Ser. No. 16/573,401 filed Sep. 17, 2019 and which issued as U.S. Pat. No. 11,130,918 B2 on Sep. 28, 2021 incorporated herein by reference in its entirety.

TECHNICAL FIELD

The present invention relates to additives and methods for removing metals from various fluids, and more particularly relates to the removal of metals, such as mercury, from glycol fluids by introducing a sulfur compound alone or in combination with at least one demulsifier, a buffering agent and/or an antifoam additive to the glycol fluids to separate the metals from the fluid.

BACKGROUND

In natural gas processing plants, the gas is treated to remove acid gases, sulfur compounds and water in order to produce a gas which is suitable for distribution to the end user. The removal of water vapor from natural gas is essential in order to avoid the formation of hydrocarbon hydrates in the gas stream and also to avoid the water condensing out of the gas in pipelines and process equipment which may then lead to corrosion problems. For this reason the maximum amount of water allowable in processed natural gas is regulated. Several methods of removing water to depress the dew point of natural gas are practiced commercially in gas processing plants. The methods employed include, but are not necessarily limited to, contacting the gas with a bed of a solid desiccant such as a silica gel or molecular sieve, and the use of liquid desiccant compounds. In the latter case, a typical process involves contacting the wet gas stream with a glycol solution in order to strip water from the gas stream into the glycol solution. This process is known as glycol dehydration and is very widely used in gas processing operations. The glycol solution is regenerated (i.e. dried) by removing the water in a boiler or in a flash tank apparatus and the resulting dry glycol is recycled back to the drying process.

In some drying processes, methanol or another alcohol may be used as an alternative to glycol or as a mixture with a glycol. Methanol in particular, optionally admixed with a glycol, is often used to dehydrate gas flowing out of a subsea well, where the formation of methane or ethane hydrates is a problem due to the cooling of the gas as it exits the well. The methanol and/or glycol are introduced directly into the pipeline, often by spraying, in order to absorb water in the gas stream. The wet methanol and/or glycol is then separated from the gas at a location downstream of the injection point, usually at the associated gas processing plant, and then regenerated by drying, e.g. by distillation before being returned to the injection point.

Mercury compounds and other metals are found in petroleum fluids such as natural gas. In a non-limiting example, the concentration of mercury in natural gas is dependent on the source and may vary from very low, e.g. about 10 $ngm^{-3}$ to high e.g. 5,000 $ngm^{-3}$ or more. When natural gas containing mercury compounds is dried in a glycol dryer, it has been found that the mercury compounds tend to partition into the glycol and thence into the water and dissolved gases separated from the glycol during glycol drying and regeneration, during which process desorbed gas, water and mercury may be evolved. The drying of the glycol for regeneration is usually done by heating to an elevated temperature which is above the boiling point of water. The temperature used is selected to be lower than the boiling point of the glycol in order to avoid decomposition of the glycol which may occur on prolonged heating. Therefore the temperature used for regeneration depends on the boiling point and thermal stability of the glycol used, e.g. triethylene glycol may be regenerated at about 200° C. Upon cooling, the water in vented gas is condensed and discharged. The waste-water and desorbed gases may contain significant amounts of mercury and thereby pose an environmental problem on discharge.

Alcohols, particularly methanol may be used in other purification processes, for example wash processes to remove sulfur compounds and $CO_2$ from gas streams, including hydrogen, ammonia or methanol syngas streams among others. Where the gas stream contains mercury or compounds of mercury, then the regeneration of the methanol wash liquid may risk discharge of the mercury to the atmosphere. Methanol absorbents may be regenerated by fractional distillation techniques in a conventional manner.

Therefore, it would be desirable to develop metal removal additives and methods using them that are less toxic and more efficient in separating metals from glycol fluids.

SUMMARY

There is provided, in one form, a method of removing metals from a glycol fluid involving introducing a sulfur compound having the general formula HS—X, where X is a heteroatom-substituted alkyl, a carboxylic acid-substituted alkyl, cycloalkyl, aryl, and/or alkylaryl group, to the glycol fluid containing at least one metal and chelating the at least one metal with the sulfur compound thereby forming a chelate complex of the sulfur compound with the at least one metal, and separating the chelate complex from the glycol fluid via, for example, solids disposal or water washing. In one non-restrictive embodiment, at least one demulsifier, a buffering agent, a $H_2S$ scavenger, and/or an antifoam additive may be optionally introduced to the glycol fluid with the sulfur compound in a blend or separately.

There is also provided, in another form, a treated glycol fluid including a glycol fluid comprising at least one metal where the treated glycol fluid also includes an additive comprising (1) a sulfur compound having the general formula HS—X, wherein X is a heteroatom-substituted alkyl, cycloalkyl, aryl, and/or alkylaryl group, and (2) at least one component including, but not necessarily limited to, at least one demulsifier, a buffering agent, an antifoam additive, and combinations thereof. The metal to be removed include, but is not necessarily limited to, lead, mercury, copper, iron, magnesium, sodium, molybdenum, zinc, cadmium, vanadium, titanium, manganese, chromium, cobalt, antimony, uranium, aluminum, tin, barium, gallium, silver, arsenic, selenium, calcium, lithium, silicon and combinations thereof. The glycol fluid to be treated may include, but is not necessarily limited to, propylene glycol (PG), monoethylene glycol (MEG), diethylene glycol (DEG), triethylene glycol (TEG), C1-C4 mono- and diethers, and combinations thereof. In one non-limiting embodiment, the treated glycol fluid additionally includes a chelate complex of the sulfur compound with the at least one metal.

DETAILED DESCRIPTION

It has been discovered that adding a sulfur compound having the general formula HS—X, either by itself or with at least one demulsifier, a buffering agent, and/or an antifoam additive, to a glycol fluid having at least one metal, such as monoethylene glycol (MEG), is useful in separating (i.e. removing) the at least one metal from the glycol fluid. More specifically, it has been discovered that a sulfur compound of the kind(s) described herein is useful to chelate the at least one metal present in the glycol fluid and form a chelate complex with the at least one metal so that the at least one metal may be more easily removed or separated from the glycol fluid.

The sulfur compound is a compound having the general formula HS—X, in which X is a heteroatom-substituted alkyl, a carboxylic acid-substituted alkyl, cycloalkyl, aryl, and/or alkylaryl group. The heteroatom may be oxygen, sulfur, phosphorous, and/or nitrogen. The alkyl, cycloalkyl, aryl, or alkylaryl groups may have from 1 independently to 12 carbon atoms; alternatively from 2 independently to 6 carbon atoms. As used herein with respect to a range, "independently" means that any threshold given may be used together with any other threshold given to provide a suitable alternative range. Non-limiting examples of sulfur compounds falling within this formula that are effective in removing (i.e. separating) metals from a fluid when applied to the glycol fluid include, but are not necessarily limited to, 2-mercaptoethanol, bis (2-mercaptoethyl) sulfide, 2-mercaptoethyl disulfide, 1,8-dimercapto-3,6-dioxaoctane, mercaptoacetic acid, glyceryl monothioglycolate, 2-mercaptophenol, 4-mercaptophenol, 1,2 dithioethane, cysteamine, N,N dimethyl cysteamine, N,N'-bis(2-mercaptoethyl) ethylenediamine, thiolactic acid, 1,3,5-triazine-2,4,6-trithiol, and the like and combinations thereof. In one non-limiting embodiment, the additive to be applied to the fluid containing at least one metal may be comprised of one or more of these sulfur compounds.

In another non-limiting embodiment, the additional components may be applied to the fluid containing at least one metal to improve separation or removal. The components that may be applied in addition to the sulfur compound described above include, but are not necessarily limited to, a buffering agent, at least one demulsifier, a $H_2S$ scavenger, and/or an antifoam additive. These additional, optional components may be blended with the sulfur compound or each other before being applied to the fluid or be added to the fluid separately in combination with the sulfur compound or in combination with each other.

A buffering agent may be applied to change pH of the glycol fluid and enhance the metal removal. Suitable buffering agents include, without limitation, glycolic acid, acetic acid, lactic acid, and combinations thereof.

Because demulsifiers work to break water-in-oil or oil-in water emulsions in fluid containing hydrocarbons, the application of at least one demulsifier to a hydrocarbon fluid may help release the metal particle complex created by the sulfur compound from the oil phase of the fluid. Suitable demulsifiers include, but are not limited to, oxyalkylated phenolic resins, oxyalkylated alkyl phenol formaldehyde resins, benzenesulfonic acid, 4-C10-13-sec-alkyl derivatives, bis(2-ethylhexyl) sulfosuccinate sodium salt, phenol (para C4-C12 alkyl) bis polymer with (chloromethyl)oxirane methyloxirane and oxirane, methyloxirane polymers with oxirane, propoxylated or ethoxylated polyamines, and combinations thereof. It has also been shown that the at least one demulsifier may be a complex blend of crosslinked polyols, oxyalkylated phenolic resins, alkylarylsulfonic acid, polyol esters, and combinations of these. In the case of treating a glycol fluid for metal removal, an antifoam additive may be optionally employed as necessary. Suitable antifoam additives may include, but are not necessarily limited to, silicones, polypropylene glycols, propylene oxide/ethylene oxide copolymers, and the like.

Suitable $H_2S$ scavengers may be any one or any combination of known scavengers for removing $H_2S$ from hydrocarbon fluids.

In some non-limiting embodiments, certain optional chelants and ionic liquids may also be added to the glycol fluid to help effect precipitation of the metals, especially in the case of removal or separation of mercury. Examples of such chelants include, but are not necessarily limited to, sodium trithiocarbonate, N,N-dimethyl dithiocarbamate, polyammonium dithiocarbamate, and/or sodium, potassium or ammonium thiocyanate.

The glycol fluid to be treated with such an additive is any glycol fluid that contains at least one metal. The metals present in the fluid may be selected from the group consisting of lead, mercury, copper, iron, magnesium, sodium, molybdenum, zinc, cadmium, vanadium, titanium, manganese, chromium, cobalt, antimony, uranium, aluminum, tin, barium, gallium, silver, arsenic, selenium, calcium, lithium, silicon, and combinations thereof. The fluid may include, but is not necessarily limited to, propylene glycol (PG), monoethylene glycol (MEG), diethylene glycol (DEG), triethylene glycol (TEG), C1-C4 mono and di ethers (e.g. ethylene glycol mono-methyl ether or ethylene glycol dimethyl ether), and combinations thereof. It will be appreciated that in one non-limiting embodiment, in the case of treating a glycol fluid, an additive comprising the sulfur compound alone may be effective in removing metals from the fluid.

Once the additive has been applied to the glycol fluid, been given time to mix with the fluid, and the treated fluid is allowed to settle, the sulfur compound and the at least one metal may be separated or removed from the glycol fluid. Without being limited to any particular mechanism or explanation, it is believed that the sulfur compound chelates the at least one metal, thereby forming a chelate complex that can be separated or removed from the glycol fluid. For purposes of this disclosure, the terms "separation," "separating," "removal," and "removing" are synonymous. "Removing" or "separating" a metal from a glycol fluid means any and all partitioning, sequestering, separating, transferring, eliminating, dividing, removing, dropping out of the metal from the fluid to any extent. In one embodiment, this separation and removal can be accomplished by directing the treated glycol fluid to a water wash to have the metal transferred to a water stream for further treatment or disposal. Alternatively, or additionally, this separation may be carried out by directing the treated glycol fluid to a centrifuge or filter for the metal to be removed from the sulfur compound as a disposable solid. That is, separating the chelate complex (i.e. the combination of the sulfur compound and the at least one metal) may be carried out by a process selected from the group consisting of centrifuging, filtering, air flotation, gravity separation, distillation, adsorption, electrophoresis, and combinations thereof, and combinations thereof.

A goal of the method is to separate the metal from the glycol fluid to an acceptable level for the glycol fluid to be properly processed, regenerated, or reused. While complete separation of metals is desirable, it should be appreciated that complete separation is not necessary for the methods and additives discussed herein to be considered effective. Success is obtained if more metals are separated from the glycol fluid using an effective amount of components of the present disclosure than in the absence of an effective amount of them. In a non-limiting embodiment, the amount of the sulfur compound effective for metal removal may range from about 1 ppm independently to about 500 ppm per ppm of the at least one metal in the glycol fluid; alternatively from about 10 ppm independently to about 400 ppm, in another non-limiting embodiment from about 25 ppm to about 300 ppm; in a different non-restrictive version from about 5 ppm independently to about 100 ppm; and in another form from about 20 ppm independently to about 50 ppm. The amount of the optional at least one demulsifier in the additive may range from about 1 ppm independently to about 500 ppm based on total volume of the glycol fluid, the amount of the optional pour point depressant may range from about 15 ppm independently to about 2000 ppm based on the total volume of the glycol fluid, and the amount of the optional antifoam additive in the additive may range from about 0.5 ppm independently to about 50 ppm based on the total volume of the fluid. Hydrogen sulfide scavengers can be applied at a proportion of from about 5 to about 20 ppm per liquid phase $H_2S$ present. These ppm units are volume ppm.

The invention will be illustrated further with reference to the following Examples, which are not intended to limit the invention, but instead illuminate it further.

EXAMPLES

Mercaptoacetic acid was evaluated in a laboratory test for mercury removal from monoethylene glycol (MEG) as shown in the Tables below. Additive A contained 60 wt % mercaptoacetic acid and 40 wt % glycolic acid. The filterable solids data in Table I shows that the mercury (Hg) content cannot be filtered from the MEG. The test procedure for the filterability test involved a 100 ml sample of fresh MEG from a sample container that was filtered through different porosity filters as specified in Table I. After filtering, the filter pads were oven dried and weighed, and the Hg content of the filtrate measured.

The bottle test results in Table II show that the addition of Additive A at 50 ppm reduced Hg from 975 to 18 ppb in 24 hours. Samples of MEG treated with mercury removal additive were hand shaken 100 times and then allowed to settle at ambient temperature for the specified time before analysis for Hg content. There was some settling of mercury in the untreated sample as the untreated Hg level dropped from 975 ppb to 328 ppb and then 117 ppb over time, but the treated samples always contained less Hg showing that the Additive accelerated Hg removal from the MEG.

The 24 hour data was most dramatic and beneficial for commercial applications as customers want the Hg to be quickly removed from their system and often do not have long residence times in storage tanks to settle the Hg particles. Visually, the MEG treated with Additive A appeared clear and not hazy or filled with particulate matter, and showed that the particulate Hg settled to the bottom of the container. In the field, this Hg particulate matter would settle to the bottom of a storage tank.

The ratio of mercaptoacetic acid to Hg in this test was 30 ppm (50 ppm dose×60% active) and the Hg content was 0.975 ppm, or about a 30:1 ratio. It may be concluded that the mercury present in the sample was soluble in the MEG as shown by the high filtrate concentrations. Mercury decreased over time in the untreated samples but Additive A at 50 ppm greatly reduced settling time and was able to achieve much lower mercury levels in the MEG.

TABLE I

Filterability Test

| Filter Size | Filterable Solids, lbs per thousand bbls (g/m³) | Hg in Filtrate (ppb) |
|---|---|---|
| Unfiltered | — | 1794 |
| 0.45 micron | 153 (438) | 1575 |
| 0.1 micron | 160 (258) | 1565 |

TABLE II

Bottle Test Results

| Sample | Additive A Dose (ppm) | Hg Content at 24 hrs (ppb) | Hg Content at 48 hrs (ppb) | Hg Content at 72 hrs with filtering |
|---|---|---|---|---|
| MEG | 0 | 975 | 328 | 117 |
|  | 50 | 18 | 7 | 6 |

In the foregoing specification, the invention has been described with reference to specific embodiments thereof, and has been described as effective in providing methods, additives, and treatments for removing metals from a glycol fluid. However, it will be evident that various modifications and changes can be made thereto without departing from the broader scope of the invention as set forth in the appended claims. Accordingly, the specification is to be regarded in an illustrative rather than a restrictive sense. For example, glycol fluids, sulfur compounds, demulsifiers, buffering agents, antifoam additives, $H_2S$ scavengers, functional groups, mixtures, process conditions and parameters, and the composition and amounts and proportions of additive and components falling within the claimed parameters, but not specifically identified in this disclosure or evaluated in a particular Example, are expected to be within the scope of this invention.

The present invention may suitably comprise, consist or consist essentially of the elements disclosed and may be practiced in the absence of an element not disclosed. For instance, method for removing metals from a glycol fluid may consist essentially of or consist of introducing a sulfur compound having the general formula HS—X, where X is a heteroatom-substituted alkyl, a carboxylic acid-substituted alkyl, cycloalkyl, aryl, and/or alkylaryl group, to the glycol fluid containing at least one metal; the sulfur compound chelating the at least one metal thereby forming a chelate complex; and separating the chelate complex from the glycol fluid.

Alternatively there may be provided treated glycol fluid consisting essentially of or consisting of a glycol fluid comprising at least one metal; an additive comprising a sulfur compound having the general formula HS—X, where X is a heteroatom-substituted alkyl, a carboxylic acid-substituted alkyl, cycloalkyl, aryl, and/or alkylaryl group, and a component selected from a group consisting of at least one demulsifier, a buffering agent, an antifoam additive, a $H_2S$ scavenger, and combinations thereof.

The words "comprising" and "comprises" as used throughout the claims, are to be interpreted to mean "including but not limited to" and "includes but not limited to", respectively. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter). As used herein, the term "and/or" includes any and all combinations of one or more of the associated listed items.

What is claimed is:

1. A method for removing metals from a glycol fluid containing at least one metal and a glycol compound, the method comprising:
   introducing a sulfur compound having the general formula HS—X, where X is a heteroatom-substituted alkyl, a carboxylic acid-substituted alkyl, cycloalkyl, aryl, and/or alkylaryl group, where the heteroatom is selected from a group consisting of sulfur, oxygen, nitrogen, phosphorus, and combinations thereof to the glycol fluid containing the at least one metal and a glycol compound, where the sulfur compound is in an amount effective to chelate at least a portion of the at least one metal; the sulfur compound chelating at least a portion of the at least one metal to form a chelate complex; and separating the chelate complex from the glycol fluid; where the glycol is selected from a group consisting of propylene glycol (PG), monoethylene glycol (MEG), diethylene glycol (DEG), triethylene glycol (TEG), and combinations thereof; where at least one metal selected from a group consisting of mercury, copper, iron, zinc, aluminum, arsenic, selenium, lithium, silicon, and combinations.

2. The method of claim 1, further comprising introducing an antifoaming agent to the glycol fluid.

3. The method of claim 1, further comprising introducing at least one $H_2S$ scavenger to the glycol fluid.

4. The method of claim 1, where the amount effective of sulfur compound ranges from about 1 ppm to about 500 ppm per the amount, in ppm, of the at least one metal in the fluid.

5. The method of claim 1, where the sulfur compound is selected from the group consisting of 2-mercaptoethanol, bis (2-mercaptoethyl) sulfide, 2-mercaptoethyl disulfide, 1,8-dimercapto-3,6-dioxaoctane, mercaptoacetic acid, glyceryl monothioglycolate, 2-mercaptophenol, 4-mercaptophenol, 1,2 dithioethane, N,N'-bis(2-mercaptoethyl) ethylene-diamine, thiolactic acid, 1,3,5-triazine-2,4,6-trithiol, and combinations thereof.

6. The method of claim 3 further comprising introducing at least one demulsifier to the glycol fluid, where the at least one demulsifier is selected from a group consisting of an oxyalkylated alkyl phenol formaldehyde resin, benzenesulfonic acid, 4-C10-13-sec-alkyl derivatives, bis(2-ethylhexyl) sulfosuccinate sodium salt, phenol (para C4C12 alkyl) bis polymer with (chloromethyl)oxirane methyloxirane and oxirane, methyloxirane polymer with oxirane, a propoxylated or ethoxylated polyamine, and combinations thereof.

7. The method of claim 1, where separating the chelate complex from the glycol fluid comprises washing the fluid with water after applying the sulfur compound.

8. The method of claim 1, where separating the chelate complex from the glycol fluid comprises a process selected from the group consisting of centrifuging, filtering, air flotation, gravity separation, distillation, adsorption, electrophoresis, and combinations thereof.

* * * * *